United States Patent

[11] 3,580,062

[72] Inventors Johannes Perthen
   3 Sedanstr. 13, Hannover;
   Werner Gerighausen, Ronnenberg; Konrad Kunzmann, Rollinghausen; Heinz Dreyer, Devese, Germany
[21] Appl. No. 747,317
[22] Filed July 24, 1968
[45] Patented May 25, 1971
[73] Assignee Said Gerighausen, said Kunzmann and said Dreyer assignors to said Perthen

[54] SURFACE-MEASURING DEVICE
   2 Claims, 1 Drawing Fig.
[52] U.S. Cl. ..................................................... 73/105
[51] Int. Cl. ..................................................... G01b 5/28
[50] Field of Search............................................ 73/105

[56] References Cited
   UNITED STATES PATENTS
   2,344,217  3/1944  Reason et al. .................  73/105
   2,405,133  8/1946  Brown ...........................  73/105

FOREIGN PATENTS
8,347  1956  Germany......................  73/105

Primary Examiner—Richard C. Queisser
Assistant Examiner—Ellis J. Koch
Attorney—Marshall & Yeasting ABSTRACT: The device comprises mechanism for moving relative to one another a workpiece and a feeler point contacting the surface of the workpiece. An electromechanical transducer is mechanically connected to the feeler point for converting into electrical signals the movements of the feeler point normal to the surface of the workpiece, and is electrically connected through an amplifier to an electrical integrator for integrating such electrical signals. A device for determining the length of the relative movement of the workpiece and feeler point is connected to apparatus for determining the magnitude of the electrical signals integrated by the integrator, to vary the magnitude of the integrated signals inversely with the length of such relative movement, so that the integration determines the mean value of the profile of the surface of the workpiece independently of such length.

PATENTED MAY25 1971 3,580,062
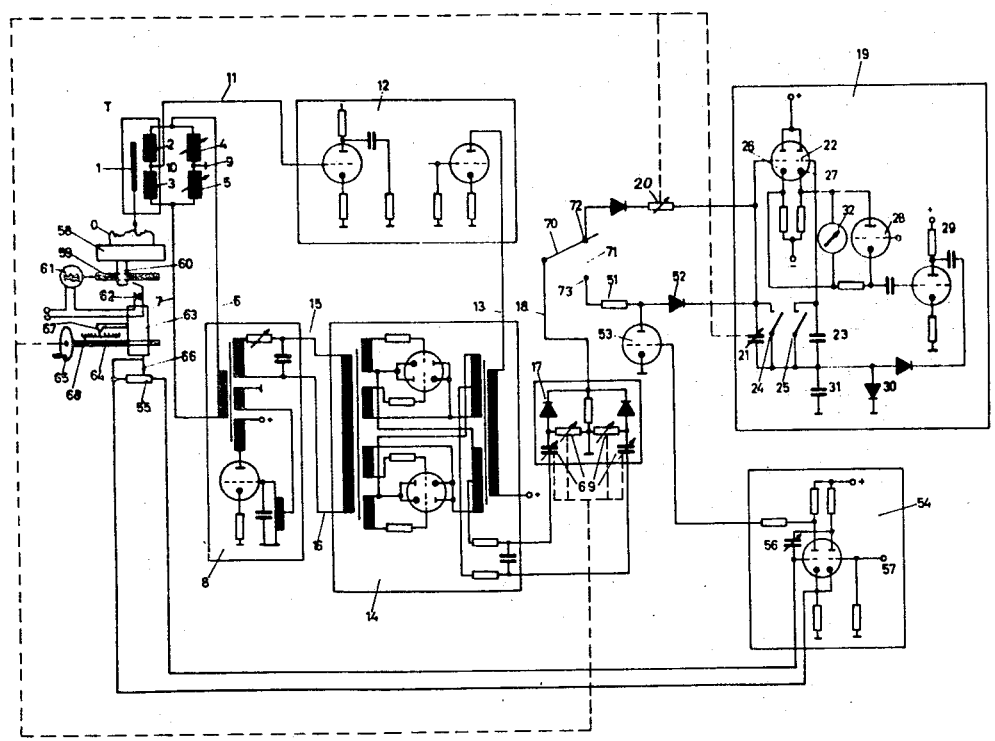

3,580,062

SURFACE-MEASURING DEVICE

BACKGROUND OF THE INVENTION

This invention relates to a surface-measuring device wherein a feeler point connected to an electromechanical transducer is moved by specific measuring lengths along the surface of a workpiece to be tested, the movements of the feeler point normal to the workpiece surface being converted by the transducer into electrical measurements which after amplification are fed to an electronic calculating device which derives the mean value of the surface profile over a specific measuring length (test distance) by dividing the output values of an integrator for length integration by a measuring time corresponding to the measuring length.

Known surface-measuring devices for deriving mean values by length integration have fixedly set measuring distances (test lengths), e.g. for 2, 5, 10 and 25 mm. lengths. Within these lengths, after deduction of a stabilization length of about 25 percent, the mean value is determined over the remaining length (reference length).

These known surface-measuring devices have the disadvantage that the divisions of test length and of the reference length dependent on said length are relatively coarse, and sensitive matching to the size of the object measured is not possible. Also when the test distance is changed, the calculating circuits for all the surface measurements must be changed at the same time.

In the surface-measuring devices also already known wherein the mean value is formed by continuous integration, the measuring lengths can of course be continuously varied. But continuous integration does not provide any objective results of observation. Instead the mean value is deduced from the pointer variations in an indicating device by means of the tester's visual observations.

Determination of the mean value over a longer reference length is therefore uncertain and difficult.

SUMMARY OF THE INVENTION

The object of the invention is therefore to provide a surface measuring device that determines the mean value of the surface profile by electronic integration over any desired measuring distance (test length), wherein the length of the desired measuring length can be varied continuously or in multiple very small steps, while the mean value is nevertheless always related to the measuring length set at the particular time.

According to the invention this object is achieved in that the continuous addition or storage of measured values in the integrator, which takes place while the surface profile is being detected, can be varied continuously or in multiple very small steps according to the test length set, by the mechanical coupling of a setting device for the test length with a test value reduction device before or behind the integrator or with a device for varying the storage capacity of the integrator.

The device provided by the invention ensures that the mean value is always determined in accordance with the test length, whatever the length may be, so that the surface testing can be better applied than previously to workpieces of varying dimensions, and it is unnecessary to have a number of measuring devices for different test lengths.

In matching the integrator to the size of the test length it is desirable to vary the storage capacity of the integrator, either by changing the size of the load resistance while keeping constant the integrator store size, or by changing the integrator store size while keeping constant the load resistance.

The relative duration of the connecting of the integrator to the measuring device can also be varied, while keeping constant the store size and the load resistance, by adjustment of a value reduction device comprising one or more variable resistances or condensers in front of or behind the integrator.

An adjustable potentiometer can for instance be used as a variable load resistance, with its control knob provided with a scale whereon the test lengths are shown. The control means for the test feeler can also be provided with a knob whereby the length of the feeler test length can be set. A condenser may also be set, instead of a potentiometer, by a control knob provided with a scale. In either case the observer must set the device to a specified test length at two separate knobs.

To simplify observations, and to avoid operating errors, the setting means for the potentiometer or the condenser are preferably mechanically coupled with the setting means for the test length, so that only one knob has to be used to set the test length and adapt the potentiometer or condenser.

To continuously variable resistance or the capacity may also comprise fixed resistances or condensers, connected in parallel and decimally graded, which are connected by decade switches to provide a total value corresponding to the test length: for instance at a first decade switch test lengths of 0, 10, 20, 30 etc. up to 100 mm. can be set, at a second switch lengths of 0, 1, etc. up to 9 mm., at a third switch lengths of 0, 0.1 etc. up to 0.9 mm., so that altogether lengths up to 100 mm. total can be set in 0.1 mm. stages.

BRIEF DESCRIPTION OF THE DRAWING

The drawing is a circuit diagram of an apparatus embodying the invention.

DESCRIPTION OF THE PREFERRED EMBODIMENT

The invention is illustrated in the drawing by one embodiment, wherein on connection of blade 70 of a switch 71 with the contact 72, the storage capacity of integrator 19 is matched to the test length by varying the load resistance or the storage condenser. If however blade 70 is connected to contact 73, the integrator is matched with the test length by a variation of the relative switching duration, with the integrator storage capacity kept constant.

The feeler pin 1 and the coils 2 and 3 form the main parts of a feeler unit T, the coils 2 and 3 being connected with coils 4 and 5 to form a measuring bridge, supplied with carrier frequency potential from an oscillator 8 through leads 6, 7. The axial movements of feeler pin 1 as its point slides over the workpiece surface 0 alter the bridge balance, causing potential differences between junction points 9 and 10. In this way the movements of the point of the feeler pin 1 normal to the surface of the workpiece are converted into electrical signals by an electromechanical transducer mechanically connected to the feeler point. Junction point 9 is grounded, while potentials at junction point 10 are fed via lead 11 to the grid of the input valve of a known carrier frequency amplifier 12.

Other types of probe may be used instead of the semibridge feeler mentioned above.

The amplified input potential is then fed via lead 13 to a known phase demodulator 14 and is there rectified in proper phase relation. For this it is necessary for the same potential to be supplied from oscillator 8 simultaneously to the measuring bridge, via leads 6, 7, and as a control potential to phase demodulator 14 via leads 15, 16. At the output of demodulator 14 there are formed electrical values which after passing through a two-way rectifier device 17 reach integrator 19 via lead 18.

With the blade 70 of switch 71 in the position shown in the drawing, a storage condenser 21 in integrator 19 is charged through a variable resistance 20, this condenser 21 lying in the grid circuit of one section of a double electron valve 22. The grid circuit of the other section also has a condenser 23 of the same size as 21, but which is not charged via lead 18. Both condensers can be discharged by switches 24 and 25.

When condenser 21 is charged, potentials which can be read on the meter 32 are formed between the cathodes 26, 27 of valve 22 and are fed as operating potentials to the valve 28 of a vibrator. The vibrator is separately excited through the grid of valve 28. After the vibrator is separately excited through the grid of valve 28. After the vibrator the potential is amplified in a carrier frequency amplifier 29 and rectified in device 30. The amplification by the carrier frequency amplifier 29 can be adjusted to provide a potential at condenser 31 of the same magnitude but of reversed polarity to that condenser 21 was charged.

Since condensers 21, 31 are additively connected, their total potential relative to earth is always zero, so that the current flowing through resistance 20 is always proportional to the load potential applied to the lead 18. Since the current flowing through the resistance 20 charges the condenser 21, the accumulated potential across the condenser 21 or 31 can be measured to determine the integral of the charging time or test length times the mean value of the surface profile.

By variation either of resistance 20 or of condenser 21 by the adjustment means 62—65 provided by the invention, the integrator storage capacity can thus be adapted to differing test lengths either continuously or in multiple small steps, so that at the end of the operation the value of the integrated signals, as shown by the meter 32, will always correspond to the mean value of the surface profile, regardless of the test length. In order to accomplish this result, when the test length is varied from a standard test length, taken as unity, the resistance 20 or the condenser 21 must be varied at the same time so as to vary the magnitude of the integrated signals inversely with the test length If however, the blade 70 of switch 71 is connected to contact 73, the test value is fed via resistance 51 and blocking diode 52 to the integrator condenser 21. Between resistance 51 and blocking diode 52 is connected an electron valve 53 acting as an electronic switch and whereby the test value maybe grounded, so that current can flow through the resistance 51 to the integrator condenser 21 only while the electron valve 53 is held open by an unblocking potential supplied thereto which opens the electronic switch and thus unblocks the path from the resistance 51 to the condenser 21. A multivibrator 54 supplies electron valve 53 with an unblocking potential whose impulse duration is matched to the test length by the setting of a precision potentiometer 55 or a precision rotary condenser 56. Since the path of flow of current from the resistance 51 to the integrator condenser 21 is unblocked during each pulse, and since the duration of each pulse is determined by the setting of the potentiometer 55 or the condenser 56, such setting also determines the magnitude of the integrated signals stored in the integrator condenser 21 during one cycle of operation. Setting means 62—65 is again used for this purpose. The surface 0 being tested is moved by a slide 58 relative to feeler unit T, this movement being effected by a spindle 59 which cooperates with the nut 60 affixed to slide 58 and is driven by electric motor 61. The initial position of slide 58 lies e.g. at the left end of spindle 59, while the end of the test length is determined by the position of a pair of contacts 62 lying in the current supply circuit of electric motor 61, and which stop supplying current as soon as opened by the nut 60.

The pair of contacts 62 are mounted on a nut 63 which is set by handwheel 65 through spindle 64. A slider 66 also affixed to nut 63 is set on the potentiometer 55 at the same time as the contacts 62. The position of nut 63 at any time and hence that also of contacts 62 and of slider 66 is read on scale 68 by a pointer 67 affixed to nut 63.

By means of a mechanical coupling either the potentiometer 55 for multivibrator 54 is set to match the test length required, or a condenser 56 is set in place of potentiometer 55, or by means of a mechanical coupling as already mentioned, by dashed lines in the drawing, the resistance 20 or condenser 21 is altered by adjustment means 62—65 and blade 70 of switch 71 is transferred to contact 72.

With a double-route rectifier circuit 17 the mean value "arithmetic mean roughness value Ra" may for instance be derived: should the "geometric mean roughness value Rs" or the "smoothing depth Rp" or the "bearing fraction tp" ("-Trangenteil") or the "ripple smoothing depth" need to be measured, other circuit elements can be connected in place of the rectifier circuit 17. The condensers and resistances 69 lying before the diodes in circuit 17 also affect the formation of the test value in the manner of a ripple separator which separates the roughness from the ripple and which reduces the amplitudes of the low electric frequencies.

This ripple separator can be adjustably coupled with the means for varying the integration with test length, so that when this length is reduced, the ripple separator can be set to a reduced ripple separation length. For this purpose the sensitivity adjusting resistances and condensers 69 lying in circuit 17 like the elements 20, 21 or 55, 56, are made adjustable and suitably coupled to the device for presetting the length of the relative movement of the workpiece and feeler point, as indicated by dashed lines in the drawing.

We claim:

1. A surface-measuring device comprising mechanism for moving relative to one another a workpiece and a feeler point contacting the surface of the workpiece, an electromechanical transducer mechanically connected to the feeler point for converting into electrical signals the movements of the feeler point normal to the surface of the workpiece, and an electrical integrator to which the transducer is electrically connected through an amplifier, for integrating such electrical signals, wherein the improvement comprises a device for presetting the length of the relative movement of the workpiece and feeler point, and apparatus for determining the magnitude of the electrical signals integrated by the integrator, such apparatus being connected to such device by means for varying the magnitude of the integrated signals inversely with the length of such relative movement, so that the integration determines the mean value of the profile of the surface of the workpiece independently of such length.

2. A surface-measuring device according to claim 1, comprising a ripple separator which is electrically connected between the transducer and the integrator to reduce the amplitude of the low frequencies, and which includes sensitivity-adjusting apparatus, connected to the device for presetting the length of the relative movement of the workpiece and feeler point.